US012643407B2

(12) United States Patent
Guzman-Magana et al.

(10) Patent No.: US 12,643,407 B2
(45) Date of Patent: Jun. 2, 2026

(54) HIGH-VOLTAGE BATTERY QUICK RELEASE SYSTEM FOR VEHICLE

(71) Applicant: FCA US LLC, Auburn Hills, MI (US)

(72) Inventors: Arturo Guzman-Magana, LaSalle (CA); Sreekanth Surapaneni, Oakland, MI (US); Gregory Fadler, Commerce Township, MI (US)

(73) Assignee: FCA US LLC, Auburn Hills, MI (US)

( * ) Notice: Subject to any disclaimer, the term of this patent is extended or adjusted under 35 U.S.C. 154(b) by 457 days.

(21) Appl. No.: 18/187,181

(22) Filed: Mar. 21, 2023

(65) Prior Publication Data

US 2024/0317062 A1     Sep. 26, 2024

(51) Int. Cl.
　B60L 3/04　　　(2006.01)
　B60K 1/04　　　(2019.01)
　F16B 31/00　　　(2006.01)
(52) U.S. Cl.
　CPC ......... B60L 3/04 (2013.01); B60K 1/04 (2013.01); F16B 31/005 (2013.01)
(58) Field of Classification Search
　CPC ...... B60L 3/04; B60K 1/04; B60K 2001/0455
　See application file for complete search history.

(56) References Cited

U.S. PATENT DOCUMENTS

| | | | | |
|---|---|---|---|---|
| 9,221,343 B2 * | 12/2015 | Tokarz | ................... | B60L 58/10 |
| 10,620,271 B2 * | 4/2020 | Bolduc | ................... | B60L 58/14 |
| 2002/0195290 A1 * | 12/2002 | Hayakawa | ................ | B60L 3/04 |
| | | | | 180/277 |

| | | | | |
|---|---|---|---|---|
| 2017/0368941 A1 * | 12/2017 | Chow | ..................... | H02M 7/44 |
| 2018/0159110 A1 * | 6/2018 | Tuomola | ................. | B60L 53/80 |
| 2022/0297542 A1 * | 9/2022 | Reinprecht | ............... | B60L 3/04 |
| 2023/0158877 A1 * | 5/2023 | Wassmur | ............. | B60L 3/0046 |
| | | | | 180/68.5 |
| 2023/0322088 A1 * | 10/2023 | Ho | ........................ | H01H 39/006 |
| | | | | 307/10.1 |
| 2024/0227567 A1 * | 7/2024 | Chavrier | ............. | B60R 25/1018 |
| 2024/0317062 A1 * | 9/2024 | Guzman-Magana | ..... | B60L 3/04 |

FOREIGN PATENT DOCUMENTS

| | | | | | |
|---|---|---|---|---|---|
| CN | 111823869 A | * | 10/2020 | ................ | H02J 7/35 |
| DE | 102021120073 A1 | * | 2/2023 | .............. | B60L 50/64 |

OTHER PUBLICATIONS

Translation of CN-111823869-A (Year: 2020).*
Translation of DE-102021120073-A1 (Year: 2023).*

* cited by examiner

*Primary Examiner* — Katy M Ebner
(74) *Attorney, Agent, or Firm* — Jeremy J. Klobucar

(57)　　　　　　ABSTRACT

A high-voltage battery quick release system for an electrified vehicle and related method for using same is provided. In one exemplary implementation, the high-voltage battery quick release system includes a first quick release switch that sends an activation signal indicative of a battery disconnect request. A mechanical decoupled is configured to mechanically decouple the high-voltage battery from the vehicle. An electrical decoupler is configured to electrically disconnect the high-voltage battery from the vehicle. A controller receives a signal from the first quick release switch and, responsive to the activation signal, (i) sends a signal to the mechanical decoupler that mechanically decouples the high-voltage battery from the vehicle and (ii) electrically disconnects the high-voltage battery from the vehicle.

8 Claims, 5 Drawing Sheets

HIGH-VOLTAGE BATTERY QUICK RELEASE SYSTEM FOR VEHICLE

FIELD

The present application relates generally to high-voltage batteries in electrified vehicles and, more particularly, to a quick release system for releasing the high-voltage battery from the vehicle.

BACKGROUND

An electrified vehicle (hybrid electric, plug-in hybrid electric, range-extended electric, battery electric, etc.) includes at least one battery system and at least one electric motor. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. In examples, the low voltage battery system is typically utilized to power low voltage components of the vehicle. In rare examples the high voltage battery system can overheat potentially leading to a thermal event. In such scenarios the vehicle occupants can safely exit the vehicle. However, as the battery system is coupled to the vehicle, some thermal events can potentially lead to the vehicle being a total loss. Accordingly, there exists an opportunity for improvement in the relevant art.

SUMMARY

In accordance with one example aspect of the invention, a high-voltage battery quick release system for an electrified vehicle is provided. In one exemplary implementation, the high-voltage battery quick release system includes a first quick release switch that sends an activation signal indicative of a battery disconnect request. A mechanical decoupled is configured to mechanically decouple the high-voltage battery from the vehicle. An electrical decoupler is configured to electrically disconnect the high-voltage battery from the vehicle. A controller receives a signal from the first quick release switch and, responsive to the activation signal, (i) sends a signal to the mechanical decoupler that mechanically decouples the high-voltage battery from the vehicle and (ii) electrically disconnects the high-voltage battery from the vehicle.

In addition to the foregoing, a high-voltage to low-voltage power change module is configured to switch battery source power. The controller is further configured to switch electrical source power from the high-voltage battery to a low-voltage battery disposed in the vehicle. The controller is configured to send a voltage source change signal to the high-voltage power change module based on the activation signal. In examples, the first quick release switch is disposed in the vehicle cabin.

In addition to the foregoing, the first quick release switch comprises one of an electrical lever, a mechanical lever, a physical button, a touchscreen button and a toggle switch.

In addition to the foregoing, the high-voltage battery quick release system further includes a second quick release switch that sends an activation signal indicative of a battery disconnect request, the second quick release switch disposed in a trunk of the vehicle.

In addition to the foregoing, the mechanical decoupler comprises a frame assembly having first and second opposing castellated frames, the first castellated frame including a first series of alternating extensions and notches, the second castellated frame including a second series of alternating extensions and notches. The controller, responsive to the activation signal, sends a signal to the frame assembly causing one of the first and second castellated frames to translate relative to the other castellated frame resulting in respective first and second extensions to ride along each other causing the frame assembly to disconnect.

In other examples, the mechanical decoupler comprises a pyrotechnic fastener that couples the high-voltage battery to the vehicle. The controller, responsive to the activation signal, sends a signal initiating a charge causing the pyrotechnic fastener to break into more than one piece disconnecting the high-voltage battery from the vehicle. In examples, the low-voltage battery is electrically coupled to an electric motor of the vehicle subsequent to the battery disconnect request. The low-voltage battery configured to propel the vehicle a predetermined distance away from the decoupled high-voltage battery.

In accordance with another example aspect of the invention, a method of disconnecting a high-voltage battery from an electrified vehicle is provided. In one exemplary implementation, a controller receives a decouple request from a quick release switch. The high-voltage battery is electrically disconnected from the electrified vehicle. A low-voltage battery is electrically connected to an electric motor of the electrified vehicle. The high-voltage battery is mechanically decoupled from the vehicle. The electric motor, powered by the low-voltage battery, is commanded to propel the vehicle a predetermined distance away from the decoupled high-voltage battery.

In addition to the foregoing, receiving the decouple request from the quick release switch comprises receiving the decouple request from a first quick release switch disposed in the vehicle cabin. In other examples, receiving the decouple request from the quick release switch comprises receiving the decouple request from a second quick release switch disposed in a trunk of the electrified vehicle.

In addition to the foregoing, mechanically decoupling the high-voltage battery includes sending a signal to a frame assembly having first and second opposing castellated frames. The first castellated frame includes a first series of alternating extensions and notches. The second castellated frame includes a second series of alternating extensions and notches. The signal causes one of the first and second castellated frames to translate relative to the other castellated frame resulting in respective first and second extensions to ride along each other causing the frame assembly to disconnect.

In other examples, mechanically decoupling the high-voltage battery comprises sending a signal to at least one pyrotechnic fastener that couples the high-voltage battery to the vehicle initiating a charge causing the pyrotechnic fastener to break into more than one piece disconnecting the high-voltage battery from the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there exists an opportunity for improvement in the art of electrified vehicles having high-voltage batteries. For example, in some instances, high-voltage batteries can overheat, get damaged or be miss-used causing a thermal event. In such scenarios, it is desirable to decouple the high-voltage battery from the vehicle and move the vehicle away from the high-voltage battery.

The present disclosure provides a high-voltage battery quick release system that allows a vehicle operator or an individual outside the vehicle (such as a first responder, etc.) to quickly and easily decouple the high-voltage battery from the vehicle. As will be described, the high-voltage battery can be mechanically and electrically decoupled using one motion of the quick release system. In the examples described herein, the high-voltage battery is released from the vehicle onto the ground. Activation of the quick release system will also electrically connect the low-voltage battery in the electrified vehicle to power the electric motor. In this way, the low-voltage battery provides sufficient power to the electric motor to propel the vehicle away from the decoupled high-voltage battery.

Figure 1:
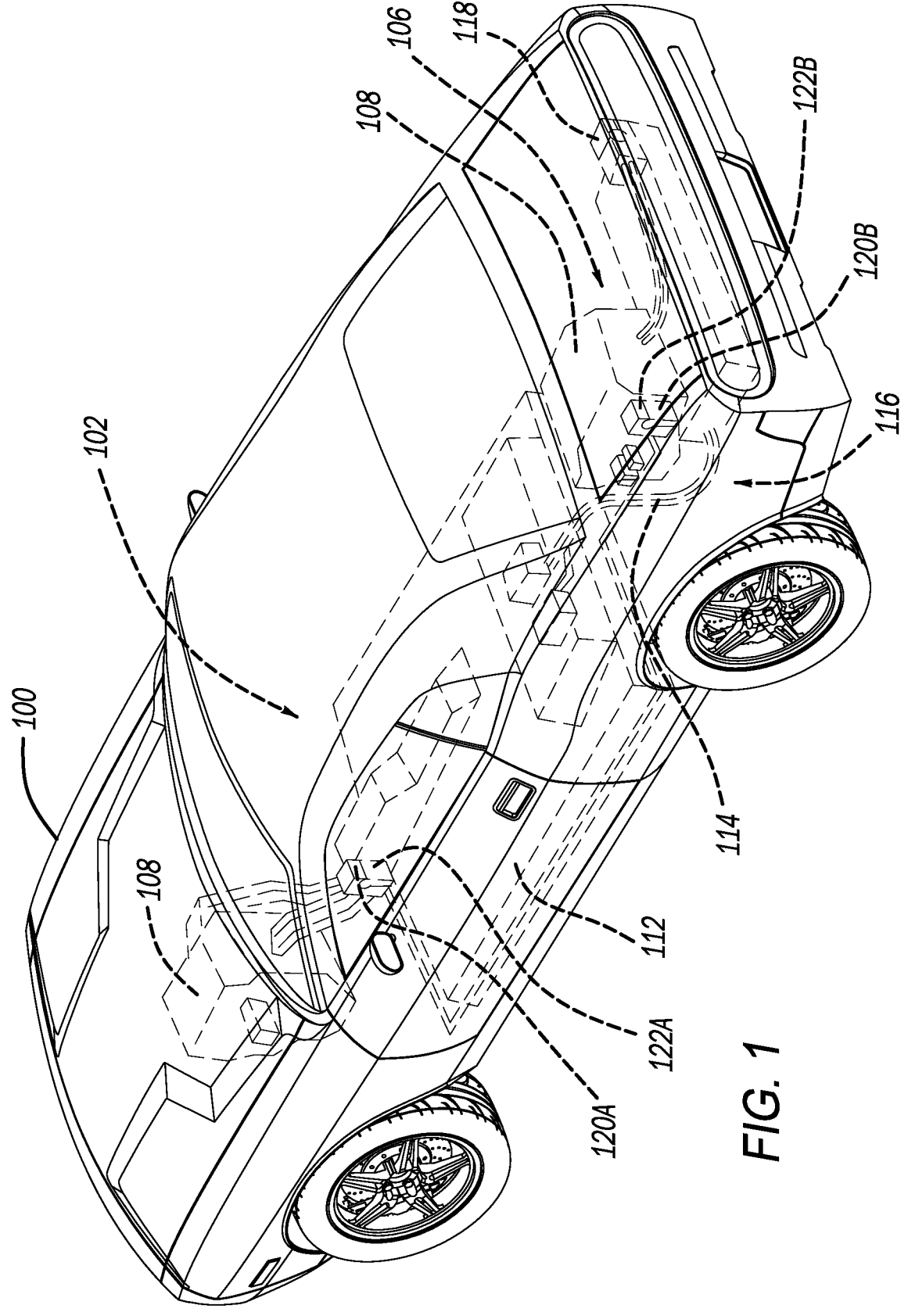
FIG. 1 is a phantom schematic representation of an electrified vehicle that incorporates a high-voltage battery quick release system according to the principles of the present disclosure.

Referring now to FIG. 1, a partial schematic representation of a an electrified vehicle 100 that incorporates high-voltage battery quick release system 102 according to examples of the present disclosure is shown. The vehicle

100 generally includes an electrified powertrain 106 comprising one or more electric motors 108. The electric motor(s) 108 are powered by a high-voltage battery system 112 (e.g., a 16 kilowatt-hour (kWh) lithium-ion battery pack) and generate drive torque that is transferred to a driveline 116 of the vehicle 100. A wire harness 114 electrically connects the high-voltage battery system 112 to the electric motor(s) 108. A low-voltage battery 118 (e.g., 12 volt) can be disposed in the vehicle 100 that is generally configured to power low voltage components of the vehicle 100. While the low-voltage battery 118 is shown in the trunk of the vehicle 100, it is appreciated that the low-voltage battery 118 can be located elsewhere in the vehicle 100. The vehicle 100 is shown generally as a passenger car coupe. It will be appreciated that the high-voltage battery quick release system 102 can be incorporated on any electrified vehicle including, but not limited to, sedans, sport utility vehicles, trucks, light commercial vehicles, people movers, and motor racing vehicles.

The high-voltage battery quick release system 102 generally includes a first quick release switch 120A and a second quick release switch 120B. The first and second quick release switches 120A and 120B can each comprise an electrical or mechanical lever 122A and 122B, respectively. It is further contemplated that one or both of the switches 120A and 120B can be a physical button, a touchscreen button, a toggle switch or other user input device. It will be appreciated that while two quick release switches 120A and 120B are shown in the examples described, the high-voltage battery quick release system 102 may only include a single quick release switch 120A or 120B. Similarly, additional quick release switches may be provided elsewhere on the vehicle 100. Regardless, each quick release switch is configured to accomplish the same task of mechanically and electrically decoupling the high-voltage battery from the vehicle and electrically connect the low-voltage battery in the electrified vehicle to power the electric motor.

Figures 2, 3A, 3B:
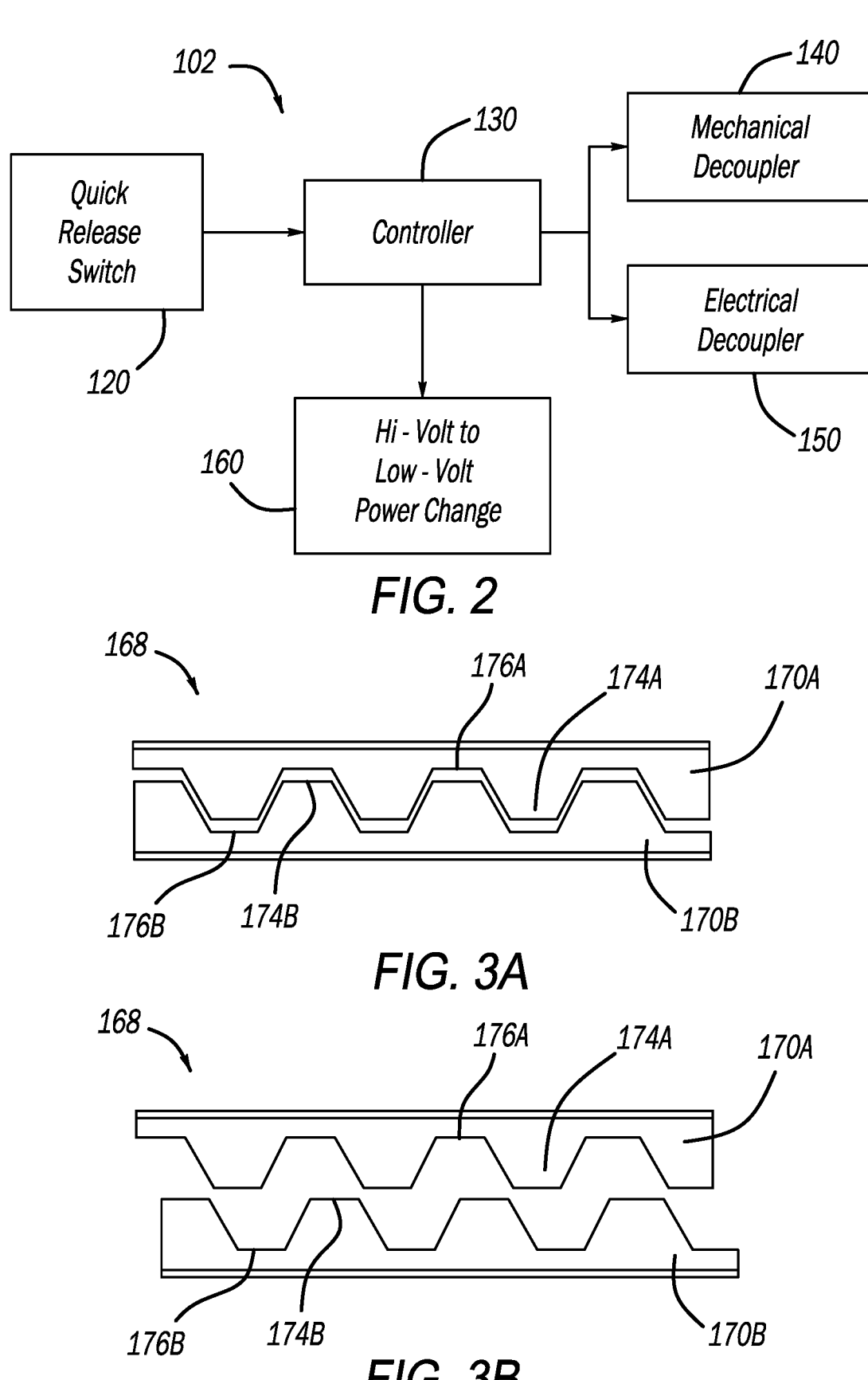
FIG. 2 is a schematic diagram of the high-voltage battery quick release system of FIG. 1 according to an example of the present disclosure.
FIG. 3A is a side view of an exemplary mechanical coupling arrangement of the high-voltage battery and shown in a coupled position.
FIG. 3B is a side view of the exemplary mechanical coupling arrangement of the high-voltage battery of FIG. 3A and shown in a decoupled position subsequent to activation of the quick release system of the present disclosure.

With additional reference now to FIG. 2, a schematic diagram of the high-voltage battery quick release system 102 is shown. The high-voltage quick release system 102 includes a quick release switch 120, a controller 130, a mechanical decoupler 140, an electrical decoupler 150 and a high-voltage to low-voltage power change module 160. The controller 130 can be a dedicated controller configured for use with the high-voltage battery quick release system 102 or be an existing controller of the vehicle such as, but not limited to, a vehicle control unit (VCU). In general, the controller is configured to receive a signal from the quick release switch 120 and send a signal to the mechanical coupler 140 and the electrical coupler 150 to decouple the high-voltage battery 112 from the vehicle 100. The controller 130 is further configured to send a voltage source change signal to the high-voltage to low-voltage power change module 160. In response to the voltage source change signal, the high-voltage to low-voltage power change module 160 switches electrical source power from the high-voltage battery 112 to the low-voltage battery 118. In this regard, the low-voltage battery 118 becomes the power source for rear electric motor 108.

The mechanical decoupler 140 can comprise any mechanical connection between the high-voltage battery 118 and the vehicle 100. In one non-limiting example, the mechanical decoupler 140 can comprise a frame assembly 168 having opposing castellated frames 170A and 170B. The castellated frame 170A can have first alternating extensions and notches 174A and 176A, respectively. The castellated frame 170B can similarly have alternating extensions and notches 174B and 176B, respectively. In this example, the second frame 170B is fixed to the high-voltage battery 112 while the first frame 170A is fixed to the vehicle 100.

Upon receiving a signal from the controller 130, one of the opposing castellated frames 170A and 170B is caused to translate (such as by an actuator, etc.) relative to the other frame. The extensions 174A and 174B ride along each other causing the frame assembly 168 to disconnect (FIG. 3B). Subsequently or concurrently, the high-voltage battery 112 is decoupled from the vehicle 100 and the electrical decoupler 150 electrically disconnects the high-voltage battery harness 114. The electrical decoupler 150 can be any electrical connector capable of connecting and disconnecting electrical components.

In other examples, the mechanical decoupler 140 can comprise one or more pyrotechnic fasteners that couple the high-voltage battery 112 to the vehicle 100. The pyrotechnic fastener can include at least one of a nut and bolt incorporating a charge. The charge can be initiated upon activation of the quick release switch 120. An electric current can cause the fastener to break into more than one piece effectively disconnecting the high-voltage battery 112 from the vehicle 100.

Figure 4:
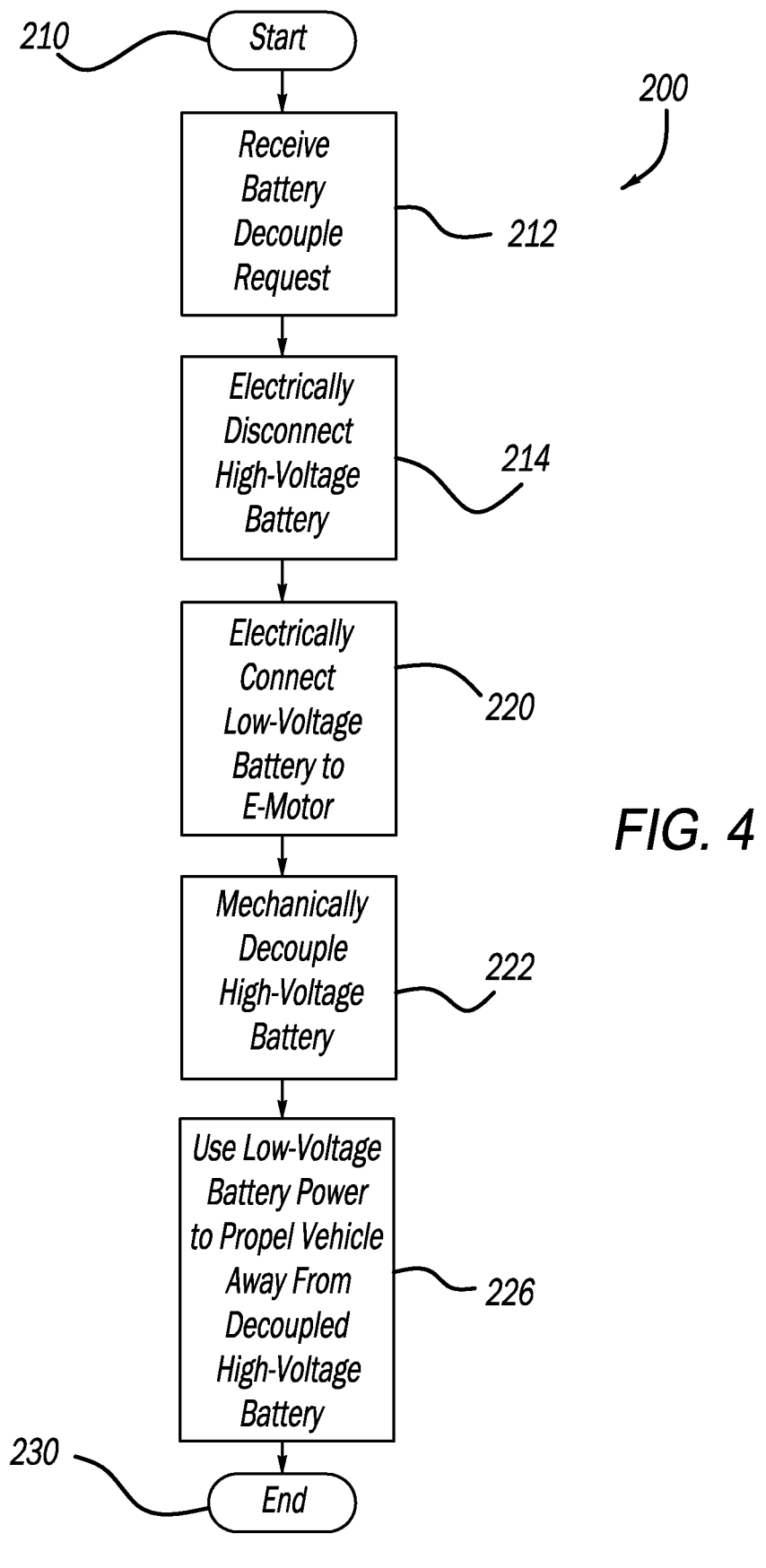
FIG. 4 is a flow chart illustrating a method of using the high-voltage battery quick release system according to one example of the present disclosure.

With reference now to FIG. 4, a flow chart illustrating a method 200 of using the high-voltage battery quick release system 102 according to one example of the present disclosure will be described. The method starts at 210. At 212, the controller 130 receives a battery decouple request. As identified above, the decouple request can be initiated by activation of one of the quick release switches 120A and 120B. It is appreciated that the quick release switch 120A can be activated by a passenger of the vehicle 100. The quick release switch 120B can be activated by an individual outside of the vehicle such as the vehicle owner, a passenger, a bystander or a first response personnel. At 214, the controller 130 sends a signal to the electrical decoupler 150 to electrically disconnect the high-voltage battery 112.

In examples, the wire harness 114 can be disconnected from the high-voltage battery 112. At 220, the controller 130 electrically couples the low-voltage battery 118 to one of the electric motor(s) 108 such as with the high-voltage to low-voltage power change module 160. In one example, the low-voltage battery 118 is configured to only power the rear electric motor 108. At 222, the controller 130 mechanically decouples the high-voltage battery 112 using the mechanical decoupler 140. At 226, the controller 130 commands the electric motor 108, powered by the low-voltage battery 118 to propel the vehicle 100 away from the decoupled high-voltage battery 112. The method 200 ends at 230.

Figures 5, 6:
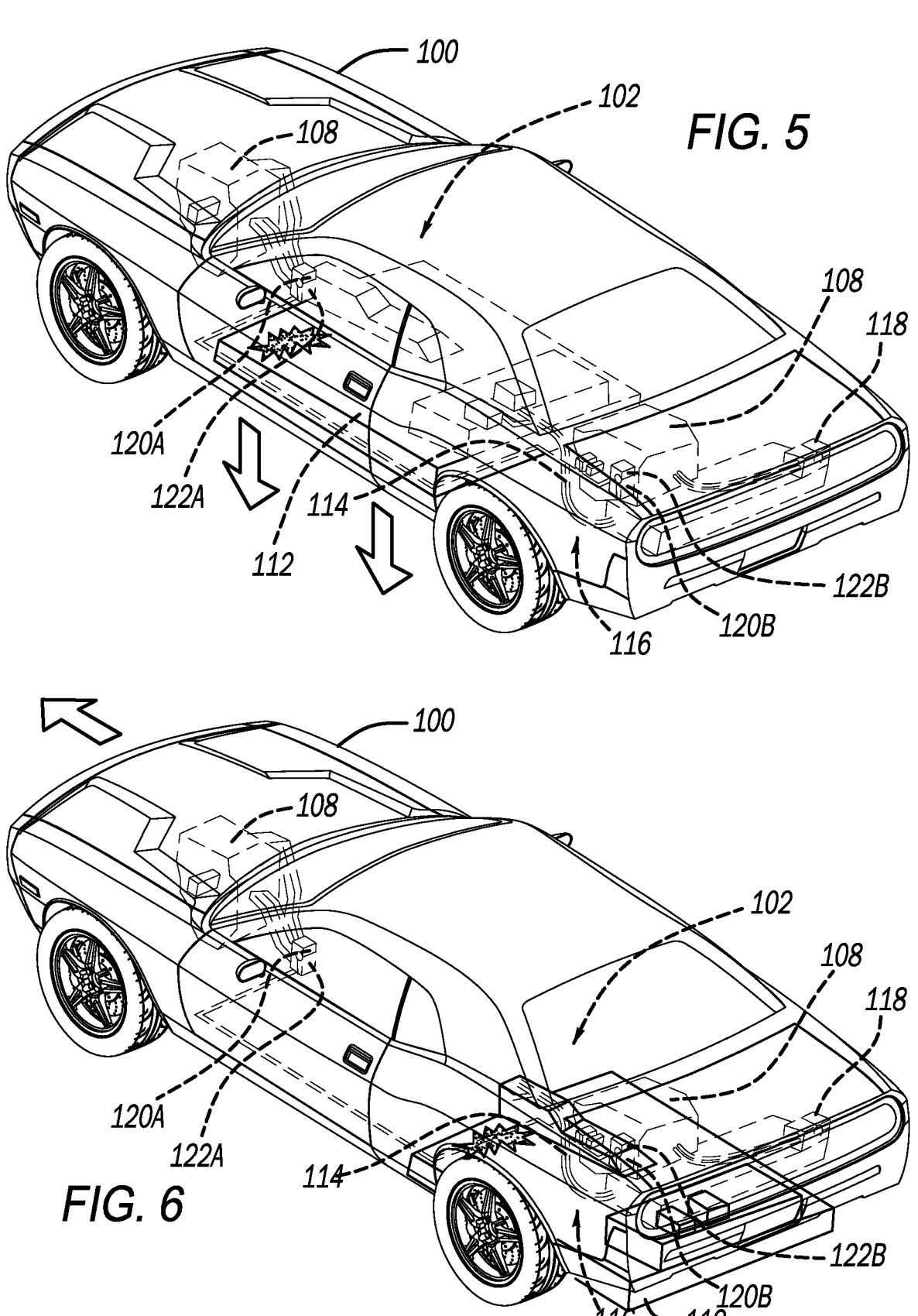
FIG. 5 is a phantom schematic representation of an electrified vehicle where the high-voltage battery has experienced a thermal event and the quick release system has initially been activated causing the high-voltage battery to become mechanically and electrically decoupled from the vehicle.
FIG. 6 is a phantom schematic representation of the electrified vehicle of FIG. 5 subsequent to the high-voltage battery being mechanically and electrically decoupled from the vehicle and the low-voltage battery powering the electric motor to propel the vehicle forward a first distance.

With particular reference now to FIGS. 5-8 a sequence of activating the high-voltage battery quick release system will be described. FIG. 5 is a phantom schematic representation of an electrified vehicle 100 where the high-voltage battery 112 has experienced a thermal event and the quick release system 102 has initially been activated causing the high-voltage battery 112 to become mechanically and electrically decoupled from the vehicle 100.

FIG. 6 is a phantom schematic representation of the electrified vehicle 100 subsequent to the high-voltage battery 112 being mechanically and electrically decoupled from the vehicle 100 and the low-voltage battery 118 powering the electric motor 108 to propel the vehicle 100 forward a first distance. While the high-voltage battery 112 is shown having a lateral span within the track width of the rear wheels, it is appreciated that in some examples the high-voltage battery 112 can be wider than the rear track width. In such examples, the rear wheels may roll at least partially over the high-voltage battery 112 to successfully move the vehicle 100 away from the high-voltage battery 112.

Figures 7, 8:
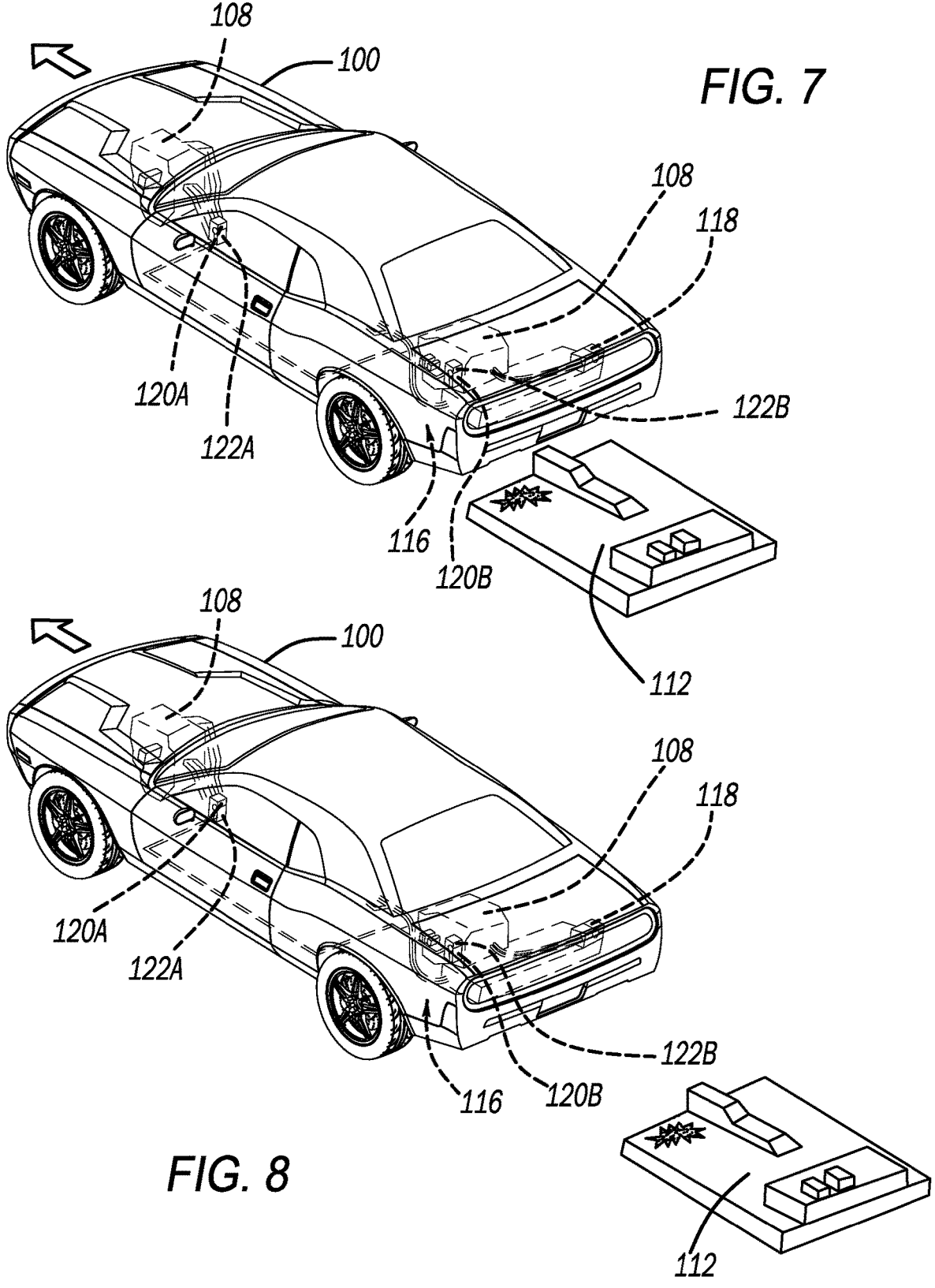
FIG. 7 is a phantom schematic representation of the electrified vehicle of FIG. 6 shown with the vehicle propelled forward a further distance from the battery.
FIG. 8 is a phantom schematic representation of the electrified vehicle of FIG. 7 shown with the vehicle propelled forward a further distance from the battery.

FIG. 7 is a phantom schematic representation of the electrified vehicle 100 shown with the vehicle 100 propelled forward a further distance from the high-voltage battery 112. FIG. 8 is a phantom schematic representation of the electrified vehicle 100 of FIG. 7 shown with the vehicle 100 propelled forward a further distance from the high-voltage battery 112.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A high-voltage battery quick release system for an electrified vehicle, the high-voltage battery quick release system comprising:
   a first quick release switch that sends an activation signal indicative of a battery disconnect request;
   a mechanical decoupler configured to mechanically decouple the high-voltage battery from the vehicle, wherein the mechanical decoupler comprises a frame assembly having first and second opposing castellated frames, the first castellated frame including a first series of alternating extensions and notches, the second castellated frame including a second series of alternating extensions and notches;
   an electrical decoupler configured to electrically disconnect the high-voltage battery from the vehicle; and
   a controller that receives a signal from the first quick release switch and, responsive to the activation signal, (i) sends a signal to the mechanical decoupler that mechanically decouples the high-voltage battery from the vehicle and (ii) electrically disconnects the high-voltage battery from the vehicle.

2. The high-voltage battery quick release system of claim 1, further comprising:
   a high-voltage to low-voltage power change module configured to switch battery source power, wherein the controller is further configured to switch electrical source power from the high-voltage battery to a low-voltage battery disposed in the vehicle.

3. The high-voltage battery quick release system of claim 2, wherein the controller is further configured to send a voltage source change signal to the high-voltage to low-voltage power change module based on the activation signal.

4. The high-voltage battery quick release system of claim 1, wherein the first quick release switch is disposed in the vehicle cabin.

5. The high-voltage battery quick release system of claim 4, wherein the first quick release switch comprises one of an electrical lever, a mechanical lever, a physical button, a touchscreen button and a toggle switch.

6. The high-voltage battery quick release system of claim 1, further comprising:

a second quick release switch that sends an activation signal indicative of a battery disconnect request, the second quick release switch disposed in a trunk of the vehicle.

7. The high-voltage battery quick release system of claim 1, wherein the controller, responsive to the activation signal, sends a signal to the frame assembly causing one of the first and second castellated frames to translate relative to the other castellated frame resulting in respective first and second extensions to ride along each other causing the frame assembly to disconnect.

8. The high-voltage battery quick release system of claim 2, wherein the low-voltage battery is electrically coupled to an electric motor of the vehicle, the low-voltage battery configured to propel the vehicle a predetermined distance away from the decoupled high-voltage battery subsequent to the battery disconnect request.

\* \* \* \* \*